_United States Patent_ [19]

Gierman et al.

[11] Patent Number: 5,385,384

[45] Date of Patent: Jan. 31, 1995

[54] CHILD SAFETY SEAT

[76] Inventors: Karl E. Gierman, 8090 Virginia, Northville, Mich. 48167; Paul Mandrik, 57470 Wood Creek Dr., Lennox, Mich. 48048

[21] Appl. No.: 103,341

[22] Filed: Aug. 6, 1993

[51] Int. Cl.⁶ ............................................. A47C 15/00
[52] U.S. Cl. ................... 297/238; 297/216.11; 297/216.12
[58] Field of Search ............... 297/238, 216.12, 216.11, 297/391

[56] References Cited

U.S. PATENT DOCUMENTS

| | | |
|---|---|---|
| 1,965,048 | 6/1934 | Morris . |
| 2,337,480 | 12/1943 | Logan . |
| 2,436,294 | 2/1948 | Glatstein . |
| 2,584,481 | 2/1952 | Mast et al. . |
| 2,966,201 | 12/1960 | Strahler . |
| 3,094,354 | 6/1963 | Bernier . |
| 4,230,366 | 10/1980 | Ruda . |
| 4,533,176 | 8/1985 | Wyttenbach . |
| 4,540,216 | 9/1985 | Hassel, Sr. . |
| 4,541,654 | 9/1985 | Jonasson . |
| 4,555,135 | 11/1985 | Freeland . |
| 4,596,420 | 6/1986 | Vaidya . |
| 4,655,503 | 4/1987 | Kamjio et al. . |
| 4,664,443 | 5/1987 | Casale . |
| 4,690,449 | 9/1987 | Holman . |
| 4,690,455 | 9/1987 | Bailey et al. . |
| 4,693,515 | 9/1987 | Russo et al. ........................ 297/391 |
| 4,722,568 | 2/1988 | Irvin . |
| 4,744,601 | 5/1988 | Nakanishi ........................... 297/391 |
| 4,756,551 | 7/1988 | Miller ................................. 297/391 |
| 4,756,573 | 7/1988 | Simin et al. . |
| 4,768,827 | 9/1988 | Musgrove . |
| 4,900,086 | 2/1990 | Steward . |
| 4,900,087 | 2/1990 | Crisp . |
| 4,902,070 | 2/1990 | Casale et al. . |
| 4,913,498 | 4/1990 | Forlivio . |
| 4,936,627 | 6/1990 | Guim . |
| 4,936,631 | 6/1990 | Mochida et al. . |
| 4,943,112 | 7/1990 | Law . |
| 4,986,600 | 1/1991 | Leblanc et al. . |
| 5,026,118 | 6/1991 | Vander Stel et al. . |
| 5,100,199 | 3/1992 | Vander Stel et al. . |
| 5,106,158 | 4/1992 | Dukatz et al. . |
| 5,135,285 | 8/1992 | Dukatz et al. . |
| 5,139,310 | 8/1992 | Itoh ..................................... 297/391 |
| 5,161,855 | 11/1992 | Harmon . |

FOREIGN PATENT DOCUMENTS

| | | |
|---|---|---|
| 66992/90 | 12/1989 | Australia . |
| 0258194 | 8/1986 | European Pat. Off. . |
| 0286542 | 4/1987 | European Pat. Off. . |
| 0324503 | 1/1988 | European Pat. Off. . |
| 0348374 | 6/1988 | European Pat. Off. . |
| 2307673 | 4/1975 | France . |
| 2624805 | 12/1987 | France . |
| 2665399 | 8/1990 | France . |

(List continued on next page.)

OTHER PUBLICATIONS

Accessories Bulletin-Volvo Parts Division-Apr. 1991-940 Sedan Child Safety Cushion-No. 2.
Accessories Bulletin-Volvo Parts Division-Sep. 1990--Child Cushion & Backrest-No. 1.

_Primary Examiner_—John T. Kwon

[57] ABSTRACT

The present invention is directed to an integral child restraint seat having selected portions lined with an energy absorbing material. When a child occupant strikes and/or loads into the child seat, a portion of the total energy dissipated is absorbed by the energy absorbing material. Thus, the overall energy absorbed by the child occupant is reduced. The integral child seat also provides a unique seat latching arrangement including a pliable member that extends from the seat member and operatively engages a stationary portion of the child seat to latch the seat member in a stowed position. This pliable member also provides an integral protective cover that extends from the seat member and covers a portion of the vehicular seat, thereby preventing the vehicular seat from becoming soiled.

17 Claims, 6 Drawing Sheets

FOREIGN PATENT DOCUMENTS

| | | |
|---|---|---|
| 2454573 | 5/1975 | Germany . |
| 7612141 | 4/1976 | Germany . |
| 2720954 | 12/1977 | Germany . |
| 7916857 | 6/1979 | Germany . |
| 2807064 | 8/1979 | Germany . |
| 2823529 | 12/1979 | Germany . |
| 2825329 | 12/1979 | Germany . |
| 3020212 | 12/1981 | Germany . |
| 3215488 | 11/1983 | Germany . |
| 3716038 | 3/1987 | Germany . |
| 3631726 | 3/1988 | Germany . |
| 59-156836 | 6/1984 | Japan . |
| 2023415 | 6/1978 | United Kingdom . |
| 2122886 | 1/1984 | United Kingdom . |
| 2167949 | 12/1984 | United Kingdom . |
| 2209666 | 5/1989 | United Kingdom . |

CHILD SAFETY SEAT

BACKGROUND OF THE INVENTION

The present invention generally relates to child restraint seats and, more particularly, to a child restraint seat of the type integrated into the backrest of a vehicular seating arrangement and having energy absorbing means for absorbing a portion of the energy dissipated when an occupant impacts and/or loads into the child seat.

Virtually all automotive passenger type motor vehicles are now equipped with safety belt restraint systems for physically restraining the seat occupant when the vehicle is subjected to a high rate of deceleration which may occur, for example, during a motor vehicle collision. While such conventional safety belt restraint systems are well suited for restraining adult passengers, it is a common practice to use a portable (i.e., "add-on") child restraint seat having a belt-type harness for children under a given age and weight. As is known, such portable child seats are placed on top of the vehicle seat and secured thereto using the existing vehicular safety belt restraint system.

In an effort to minimize the inconvenience associated with installing and/or stowing portable child seats, some automotive passenger type motor vehicles are now available with seating arrangements that have a "built-in" or integral child restraint seat integrated into the backrest of an otherwise conventional seat. When the child seat is stowed, the seating arrangement accommodates an adult in a normal seated position while preserving the overall cosmetic appearance and comfort of the vehicle seat. When needed, the integral child seat can be deployed by rotating a seat member to a lowered operative position and elevating a headrest member to a raised operative position, thereby exposing a belt-type harness restraint provided for physically restraining a child within the seat. Following use, the integral child seat can be stowed by lowering the headrest member and raising the seat member to their respective stowage positions concealed within the backrest. It is also common to utilize a latching mechanism for latching the integral child seat in its stowed position.

As is obvious, the primary function of an integral child restraint seat is to restrain the child when the vehicle is subjected to an impact or a heavy braking condition. Accordingly, if the child seat occupant strikes and/or loads into the child seat, the energy dissipated is absorbed by both the child's body and the child seat. Therefore, it would be desirable to provide a child seat that absorbs a greater percentage of the total energy dissipated, thereby reducing the amount of energy absorbed by the child seat occupant.

SUMMARY OF THE INVENTION

Accordingly, one feature of the present invention is directed to lining selected portions of an integral child seat with an energy absorbing material. The lining provides what is commonly known as a "passive restraint" and serves the purpose of absorbing a greater amount of the total energy dissipated when the child occupant impacts and/or loads into the child seat. As a result, the overall amount of energy absorbed by the child occupant's body is reduced.

As a related object, energy absorbing material is incorporated into the headrest and upper portions of the backrest of the integral child seat to effectively reduce the amount of energy absorbed by the occupant's head and torso regions.

Another object of the present invention is to provide an improved latching arrangement for retaining the seat member of the integral child seat in its stowed position. Thus, a pliable member has been provided that extends from the seat member and can be releasably attached to the backrest, thereby maintaining the seat member in a held relationship with respect to the seat back. Moreover, this pliable member also serves the purpose of providing a protective cover for preventing the seating surface of the vehicular seat from becoming soiled when the integral child seat is deployed.

Additional objects, advantages, and features of the present invention will become apparent to those skilled in the art from studying the following written description and appended claims, taken in conjunction with the accompanying drawings.

DETAILED DESCRIPTION OF THE PREFERRED EMBODIMENT

The present invention is generally directed to an improved child restraint seat that is integrated or "built-in" into a vehicular seating arrangement. More particularly, various embodiments of an integrated child restraint seat are disclosed which offer improved functional and operational advantages over conventional integral child seats. Thus, it is to be understood that while various embodiments of the present invention are hereinafter disclosed in association with a particular vehicular seating arrangement, the seating arrangement is merely an exemplary representation of one type of environment to which the present invention is readily applicable. In addition, it is contemplated that the integral child seat of the present invention can be further utilized in any passenger-carrying vehicle, such as airplanes, buses, trains and the like.

Figure 1:
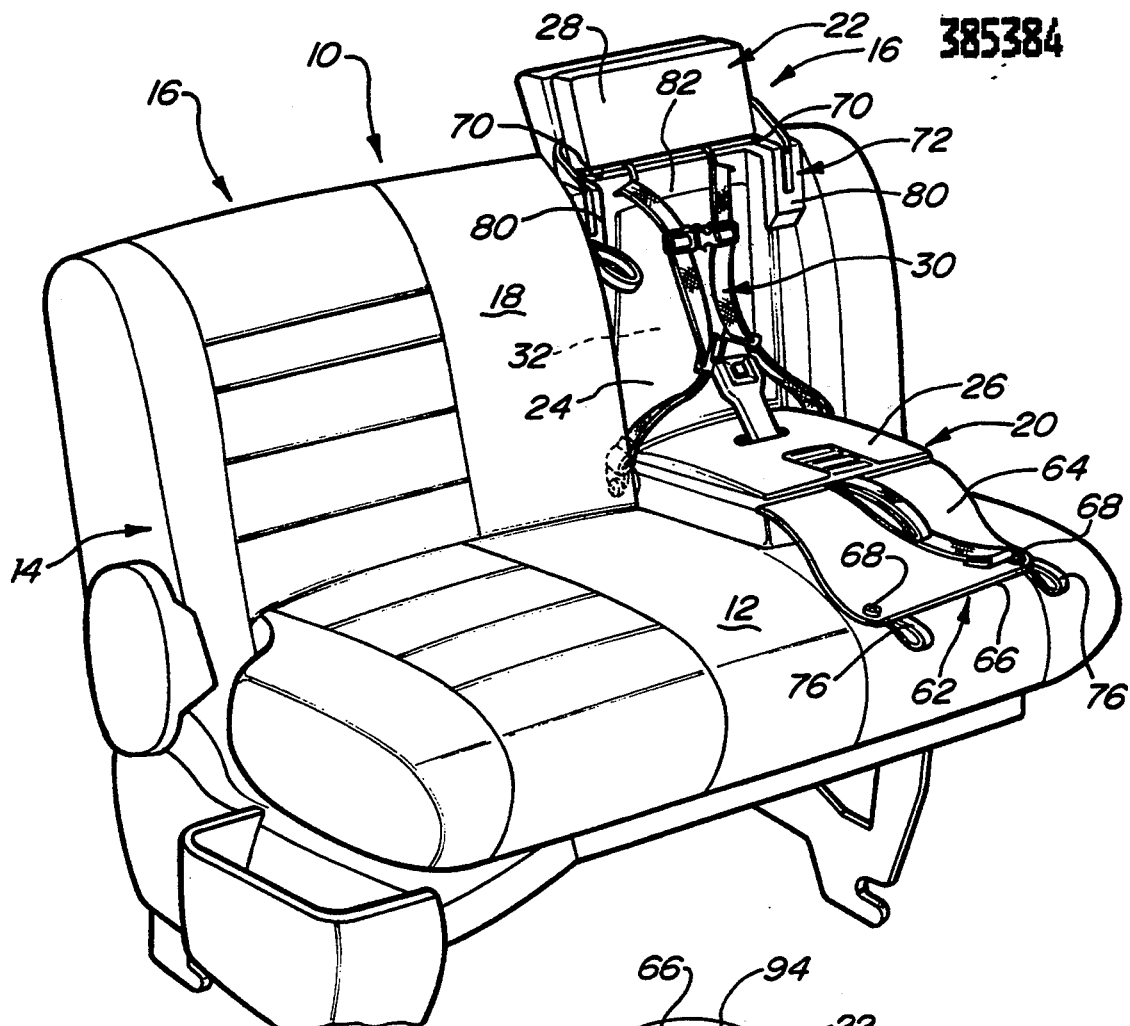
FIG. 1 is a perspective view of an exemplary vehicular seat having two integral child restraint seats embodying the novel principles of the present invention, and which shows one of the integral child seats in a "stowed" position and the other integral child seat in a "deployed" position.

Referring now to the drawings, and particularly to FIG. 1, an exemplary seat 10 of the type used in passenger-type motor vehicles is shown. More particularly, seat 10 is shown as a two-occupant bench seat of the type commonly installed in the middle seating section of a van-type motor vehicle. Bench seat 10 includes a seat cushion 12, a backrest 14 and a pair of integral child restraint seats 16 incorporated into backrest 14 on opposite sides of a central padded portion 18. Each integral child seat 16 includes a seat member 20 and a headrest 22. As shown, one integral child seat 16 is retracted into a "stowed" position while the other integral child seat 16 is shown deployed to an "operative" position. In the stowed position, integral child seat 16 is completely concealed within backrest 14 such that bench seat 10 has the cosmetic appearance and function of an otherwise conventional bench seat. Thus, with integral child seat 16 in the stowed position, bench seat 10 can be used in the usual manner with an adult or larger child restrained by a conventional vehicular safety belt restraint system (not shown). However, when an integral child seat 16 is deployed, a back pad 24, a cushion pad 26, a headrest pad 28 and a safety belt restraint system, shown as a belt-type harness restraint 30, are exposed. As will be detailed hereinafter, one unique feature of the present invention is that energy absorbing means is disposed in selected portions of integral child seats 16. Such energy absorbing means is provided for absorbing a portion of the energy dissipated upon the child impacting and/or loading child seat 16 in response to the occurrence of relative movement between the child seat occupant and child seat 16.

With particular reference now to FIGS. 2 through 5, portions of integral child seat 16 are shown in a variety of positions to more clearly illustrate the novel structure and operational features of the present invention. In general, integral child seat 16 is a modular assembly that is secured to a seatback frame structure (not shown) within bench seat 10. More specifically, the basic components of integral child seat 16 include a back support 32, seat member 20 which is coupled for pivotable movement relative to a lower portion of back support 32, and headrest 22 which is coupled for pivotable movement relative to an upper portion of back support 32. To this end, back support 32 is a structural member that is adapted to be affixed to the underlying frame structure of bench seat 10 for enabling seat member 20 and headrest 22 to pivot between their respective storage and operative positions. In addition, the underlying structure of headrest 22 and seat member 20 is provided by a head support panel 34 and a seat pan 36, respectively.

Figure 3:
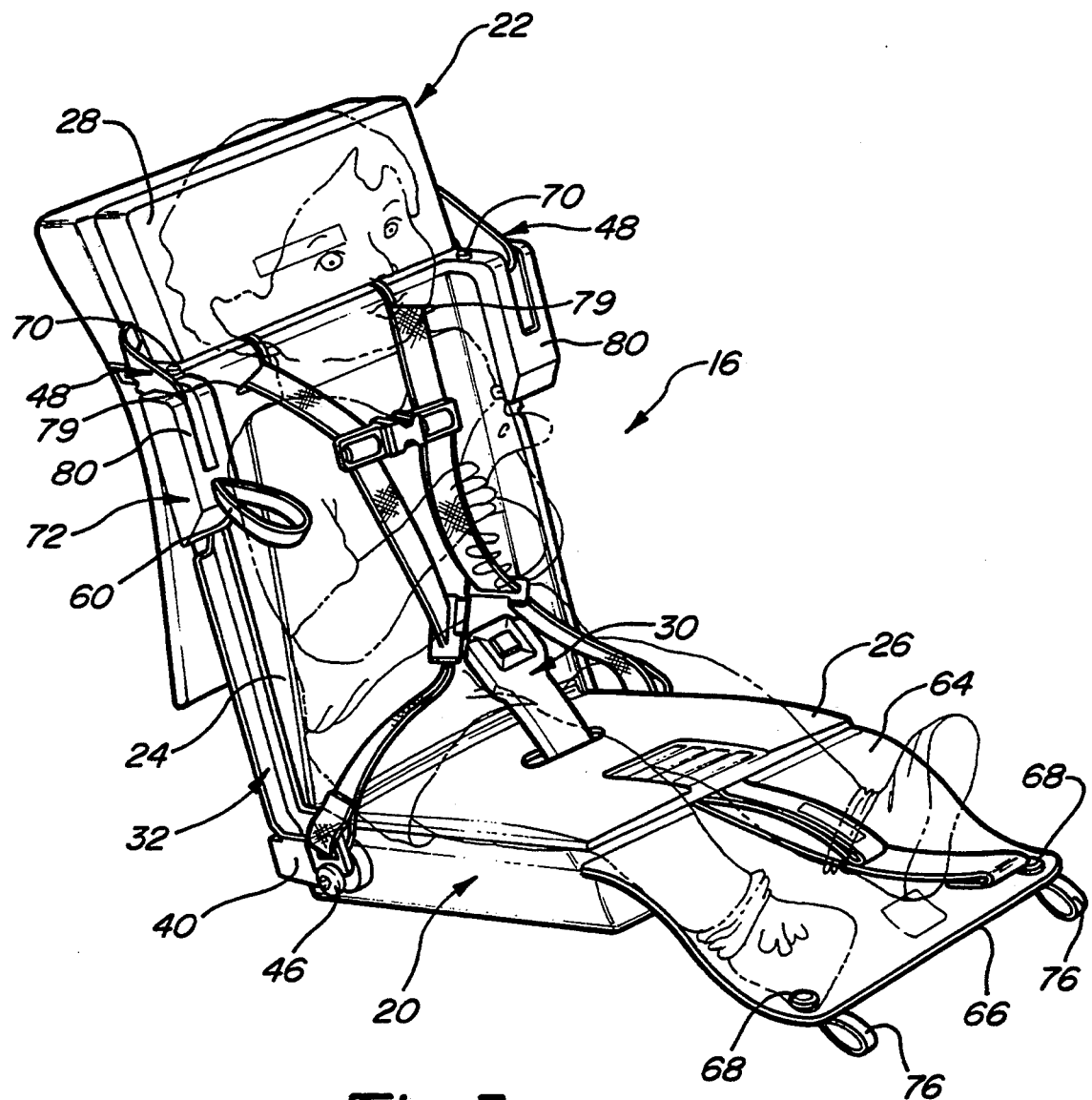
FIG. 3 is a perspective view of the integral child seat in its deployed position removed from the vehicular seat to more clearly illustrate its structure.
Figure 4:
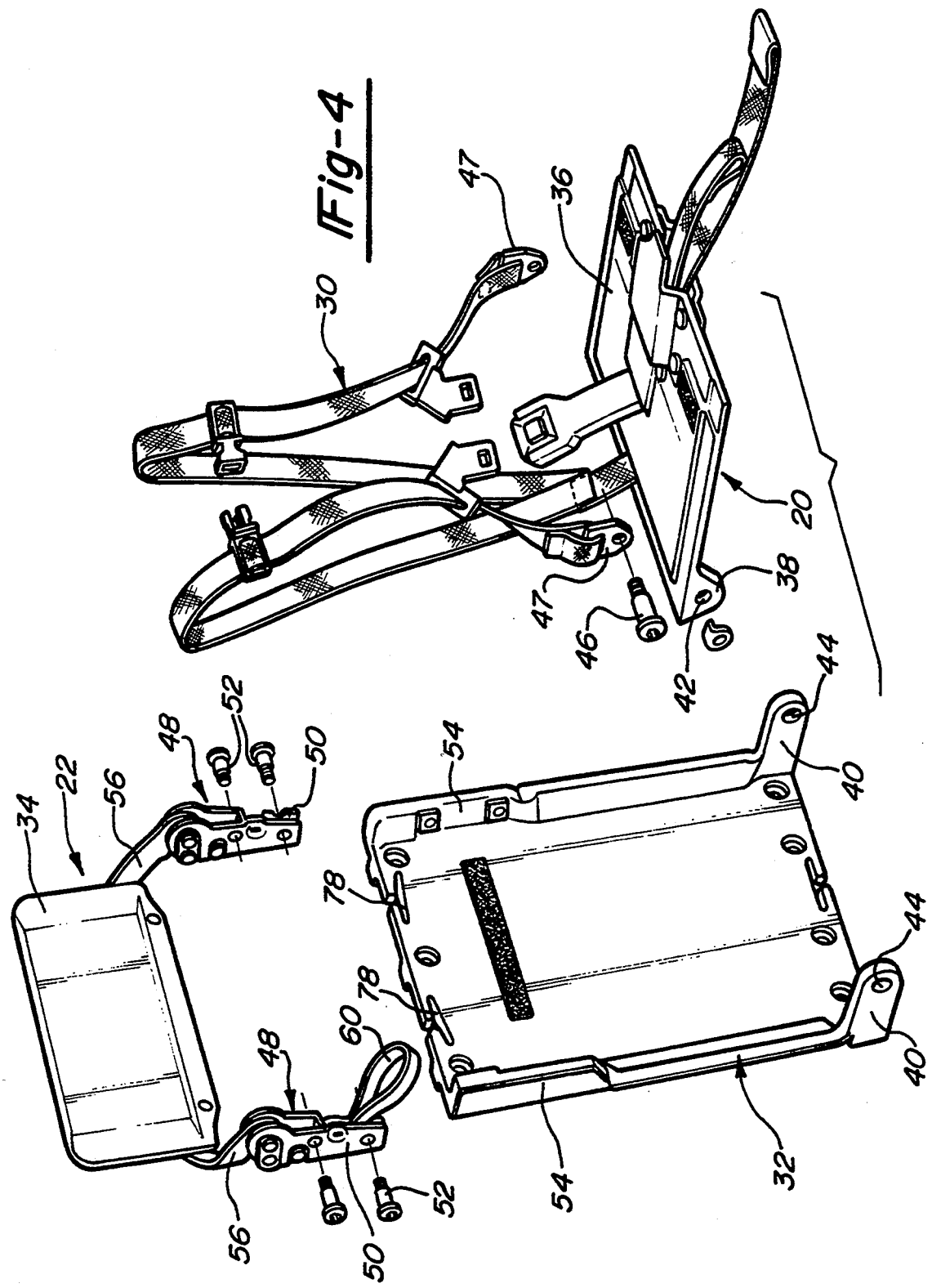
FIG. 4 is an exploded perspective view showing the structural and belt restraint components of the integral child seat of the present invention.

As best shown in FIG. 4, a rear portion of seat pan 36 has a pair of flanges 38 that extend downwardly from opposite lateral edges thereof. Flanges 38 are positioned adjacent to a pair of flanges 40 that extend forwardly from lower lateral edges of back support 32 such that bores 42 and 44 within flanges 38 and 40, respectively, are alignable for receipt of a pivot pin 46 therein. Each pivot pin 46 is also used for securing an anchor plate 47 that is retained on each distal end of harness 30 to the rigid frame structure of child seat 16. Head support panel 34 is pivotally coupled to an upper reinforced portion of back support 32 by a pair of hinges 48. As shown in FIG. 4, an outer bracket portion 50 of each hinge 48 is removably attached, such as by threaded fasteners 52, to an elongated flange 54 that extends forwardly from the upper lateral edges of back support 32. As is further shown in FIG. 4, pivoting portions 56 of each hinge 48 extend upwardly and rearwardly such that a distal end thereof is affixed to one side of head support panel 34. By mounting hinges 48 to flange 54 that extends forwardly from back support 32, and by utilizing pivoting portions 56 that extend upwardly and rearwardly, optimal positioning of headrest 22 is achieved in both the raised operative and lowered storage positions as shown in FIGS. 1-3.

As shown in FIG. 1, one of integral child seats 16 is fully deployed with both headrest 22 and seat member 20 pivoted to their respective operative positions. In its operative position, headrest 22 is elevated over backrest 14 and is latched in place by a conventional spring-biased latch mechanism (not shown). The latch mechanism is integrated into hinge 48 and can be manually-operated for releasing headrest 22 from its latched operative position by pulling on release loop 60. Seat member 20, on the other hand, does not latch in its lowered operative position since the weight of a child occupant seated thereon holds it in the deployed position. As is also shown in FIG. 1, the other integral child seat 16 is concealed within backrest 14 of bench seat 10 with its seat member 20 and headrest 22 each pivoted to their respective stowed positions.

To prevent headrest 22 or seat member 20 from articulating out of their respective stowed positions, headrest 22 and seat member 20 are preferably latched in place. Typically, headrest 22 is latched in its lowered stowage position by the same the latch mechanism used to latch it in its raised operative position. However, seat member 20 is releasably maintained in its raised stowage position utilizing an improved latching arrangement 62 which is operable for holding seat member 20 with respect to back support 32.

Figure 2:
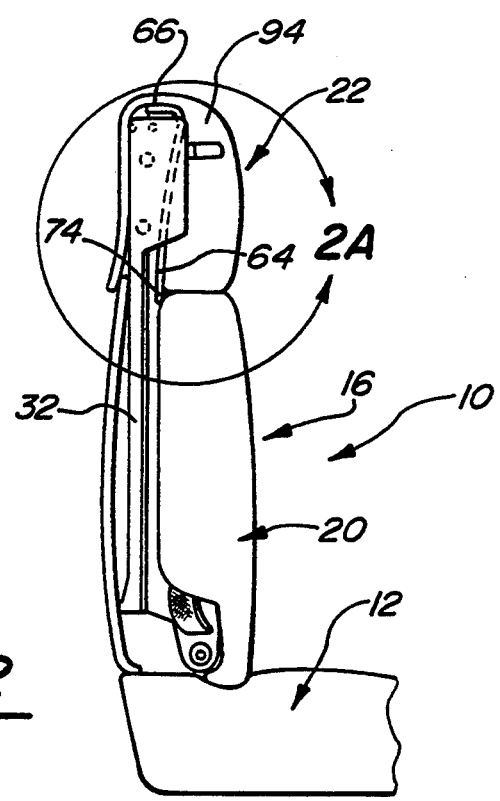
FIGS. 2 and 2A are partial side views of the integral child seat in its stowed position and showing a pliable latching member of an improved seat latching arrangement.
Figure 2A:
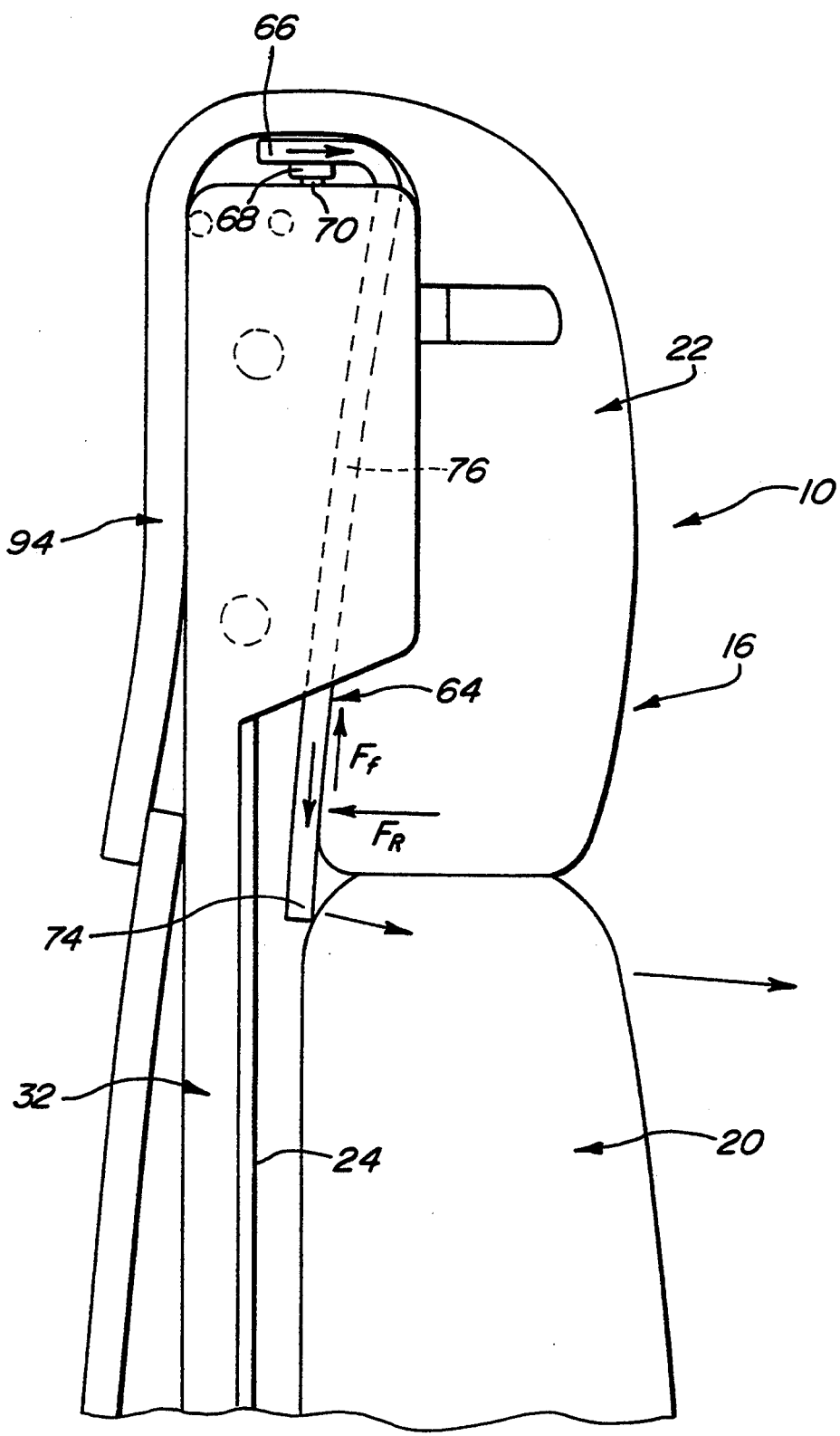

As best shown in FIGS. 2, 2A and 3, this simplified latching arrangement 62 comprises a pliable member 64 that extends from the free end of seat member 20. Pliable member 64 is preferably made of a fabric-backed vinyl coated material, however, other materials such as cloth, canvas or the like could be utilized. Moreover, a distal end 66 of pliable member 64 has retaining means affixed thereto, preferably snaps 68, that are adapted to engage corresponding snap retainers 70 that extend from a cover member 72 secured to back support 32. As best shown in FIGS. 2 and 2A, when seat member 20 is in its stowed position, pliable member 64 extends vertically along the upholstered outer surface of back pad 24. Moreover, snaps 68 at distal end 66 of pliable member 64 engage corresponding snap retainers 70. In order to engage snaps 68 with snap retainers 70, pliable member 64 must be of a predetermined size (i.e., length) to prevent seat member 20 from articulating out of its stowed position toward its deployed position.

In order to prevent snaps 68 on pliable member 64 from disengaging snap retainers 70 during a sudden deceleration of the vehicle, snap retainers 70 in this particular embodiment are oriented vertically. Thus, when the inertia of seat member 20 urges it to pivot forwardly toward its deployed position during such a deceleration, thereby tensioning pliable member 64, snaps 68 are loaded in shear. While snaps 68 are readily released from engagement with snap retainers 70 by pulling pliable member 64 vertically away from snap retainers 70, snaps 68 will not disengage snap retainers 70 when snaps 68 are loaded in horizontal shear (i.e., when loaded perpendicular to the orientation of snap retainers 70).

To further ensure that snaps 68 maintain seat member 20 in its raised stowage position, headrest 22 is adapted to engage pliable member 64 when it is articulated into its lowered stowage position. As best shown in FIGS. 2 and 2A, when headrest 22 is latched in its lowered stowage position, pliable member 64 is sandwiched between headrest 22 and back support 32. By engaging headrest 22 with pliable member 64, headrest 22 provides both a reactive force $F_R$ and frictional forces $F_f$ when seat member 20 is urged toward its lowered deployed position. In other words, when child seat 16 is stowed as shown in FIG. 2A, and seat member 20 is urged to articulate toward its deployed position, the proximal end 74 of pliable member 64 attached to seat member 20 is urged to move in a forward direction. As a result, distal end 66 of pliable member 64 is tensioned against snaps 68 while a central portion 76 of pliable member 64 loads against headrest 22. However, since headrest 22 is mechanically latched in its stowage position via the latch mechanism, headrest 22 is held stationary and provides a reactive force against pliable member 64 that assists in preventing seat member 20 from articulating toward its deployed position. In addition, since headrest 22 is latched in its stowage position, pliable member 64 is maintained in its vertical orientation, sandwiched between headrest 22 and back support 32. Thus, tension within pliable member 64 is strictly maintained in a direction perpendicular to snap retainers 70, thereby ensuring that snaps 68 are loaded horizontally in shear.

In order to deploy child seat 16 from its latched and stowed position to its deployed position, the first step is to actuate the latch mechanism via release loop 60 for unlatching headrest 22 and subsequently articulate headrest 22 to its elevated operative position above backrest 14. Next, snaps 68 on pliable member 54 are then disengaged from snap retainers 70 by grasping finger loops 76 that extend from pliable member 64 near snaps 68 and pulling them vertically upwardly in a direction parallel to snap retainers 70. Thereafter, seat member 20 is free to articulate toward its lowered deployed position supported upon seat cushion 12 of bench seat 10. In this operative position, belt-type harness restraint 30, which extends through slots 78 in the upper portion of back support 32 and slots 79 in cover member 72, is exposed and ready for restraining the child occupant in a known manner.

As shown in FIG. 1, when seat member 20 is in its deployed position, pliable member 64 extends forwardly along seat cushion 12 of bench seat 10 in front of seat member 20. In this position, pliable member 64 serves as a protective cover for seat cushion 12 of bench seat 10, preventing mud or other debris from soiling the bench seat upholstery. Therefore, not only does this unique pliable member 64 greatly simplify the construction and operation of child seat 16 by eliminating the need for a complicated seat latch mechanism, it also serves as a protective "mud flap" that prevents the upholstered surface of bench seat 10 from becoming soiled by the child occupant.

Figure 5:
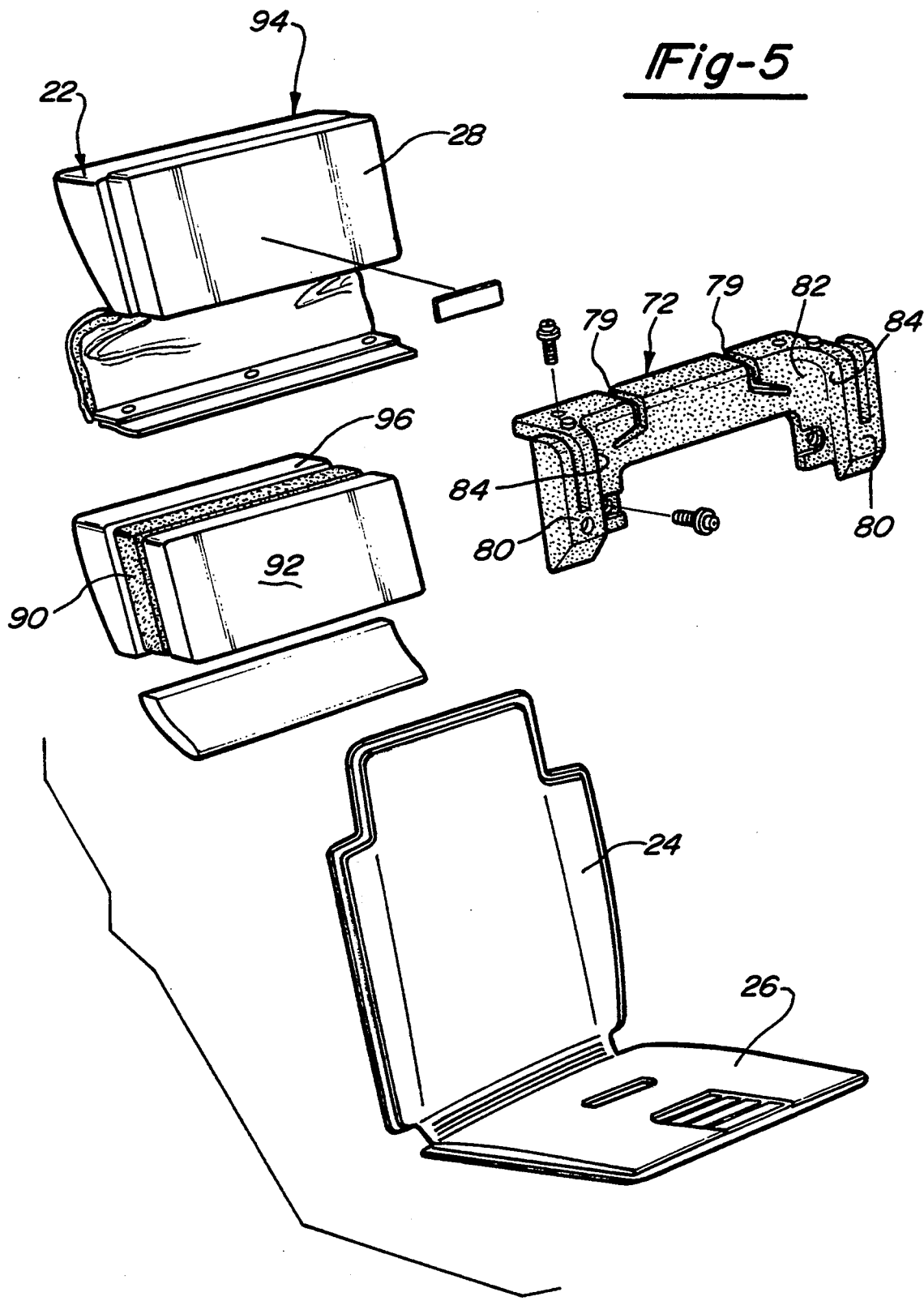
FIG. 5 is an exploded perspective view showing the upholstery and energy absorbing components of the integral child seat of the present invention.

In addition to the above described features, integral child seat 16 of the present invention also includes energy absorbing means for absorbing a portion of the energy dissipated when the child seat occupant impacts and/or loads into child seat 16. As shown in FIGS. 3 and 5, an exemplary embodiment of one type of energy absorbing means is incorporated into cover member 72. In a preferred form, cover member 72 is fabricated (i.e, molded) from a suitable energy absorbing material, such as a thermoplastic foam or the like. Moreover, cover member 72 spans the upper portion of back support 32 and has a pair of end portions 80 that extend from each end thereof in a forward direction. Thus, a recess 82 is defined within cover member 72 for receiving a portion of the occupant's upper torso region. As shown in FIG. 3, when a child is seated in integral child seat 16, the child occupant's upper torso is at least partially disposed within recess 82. As is shown, end portions 80 extend forward from cover member 72 such that inner opposing surfaces 84 on end portions 80 limit the amount of lateral movement permitted by the child occupant operatively seated therein.

When a vehicle is "rear-ended" (i.e., struck from behind by another vehicle), the vehicle rapidly accelerates causing relative acceleration between the child occupant and child seat 16 occurs. In this instance, headrest 22 and back support 32 of child seat 16 would be suddenly accelerated toward the occupant for causing the child to load rearwardly into child seat 16. Thus, the present invention includes incorporation of energy absorbing cover member 72 and further includes a second energy absorbing means disposed within headrest 22. Preferably, headrest 22 includes a layer or pad 90 of energy absorbing material in addition to the conventional cushioning materials. Thus, a portion of the energy dissipated is absorbed by the crushing of pad 90. Therefore, the amount of energy absorbed by child occupant in his/her head and upper torso regions is reduced.

Figure 6:
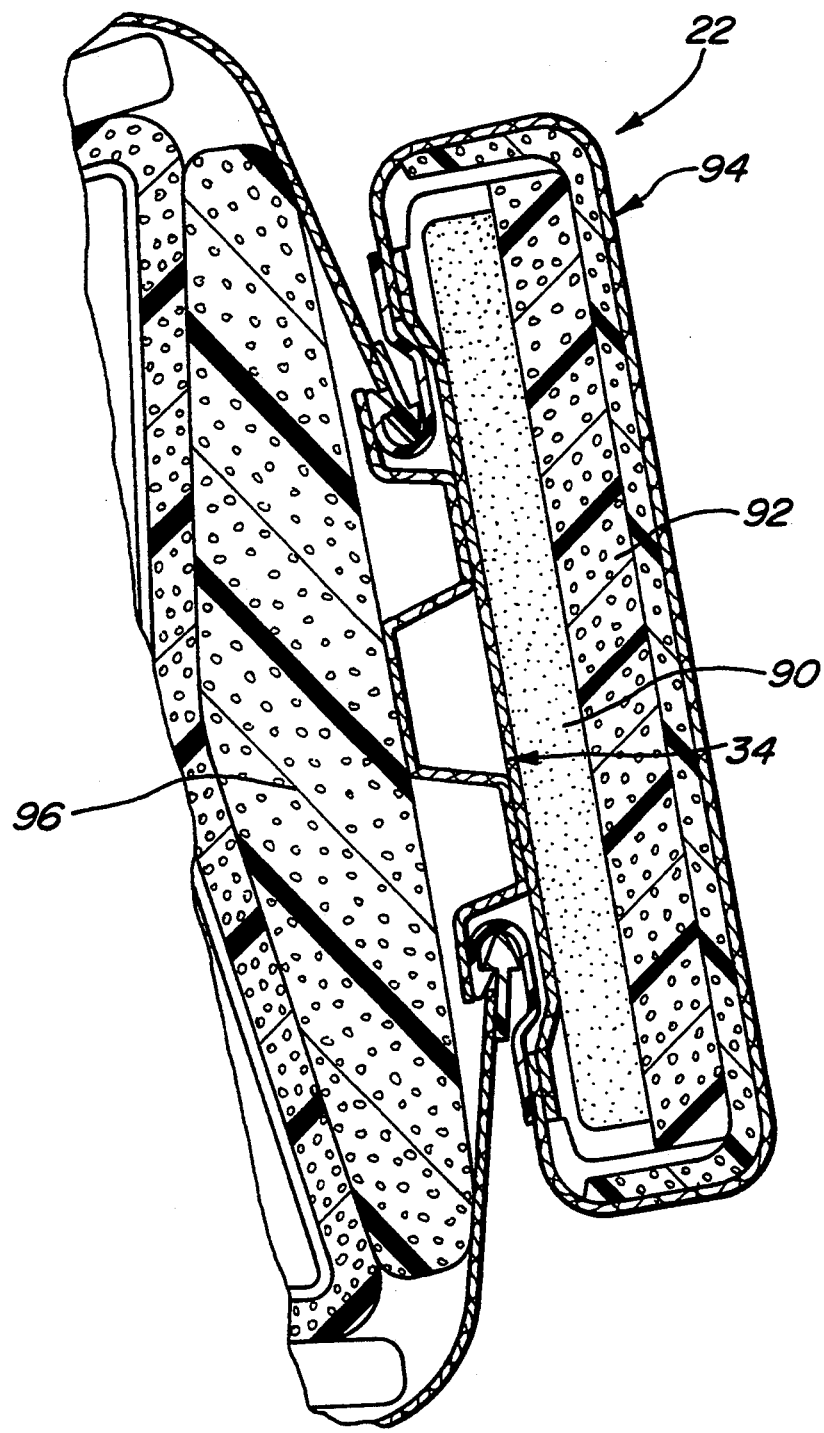
FIG. 6 is a cross-sectional view illustrating an energy-absorbing child seat headrest in accordance with the principles of the present invention.

In order to ensure that the energy absorbing material crushes, backing members are provided to support the energy absorbing material against a rigid surface. As depicted in FIG. 6, head support panel 34 serves as the backing member for supporting energy absorbing pad 90 within headrest 22. More particularly, head support panel 34 supports energy absorbing pad 90 and a cushion pad 92 that extends forwardly from head support panel 34. Note, cushion pad 92 and energy absorbing pad 90 are surrounded by conventional upholstery materials, shown as an upholstered hood-type assembly 94. If the occupant's head loads rearwardly into headrest 22, head support panel 32 supports energy absorbing pad 90, thereby allowing the material to crush, rather than simply deflect as a result of the load. On the other hand, when headrest 22 is in its stowage position and an adult occupant (not shown) is sitting in bench seat 10, the occupant's body contacts the upholstered hood 94 adjacent to a rear cushion 96.

Energy absorbing cover member 72 and its end portions 80 may also be similarly provided with backing members. Moreover, in the embodiment depicted in FIGS. 3 through 5, the energy absorbing cover member 72 is supported by the upper portion of back support 32. In addition, hinges 48 provide lateral support to energy absorbing end portions 80. Thus, both cover member 72 and end portions 80 are provided with backing members that will support a suitable energy absorbing material in the event of being loaded by the occupant. Moreover, hinges 48 can be substantially disposed within energy absorbing end portions 80, thereby complementing hinges 48 by concealing them and providing a layer of energy absorbing material between hinges 48 and the occupant. Furthermore, cover member 72 is preferably an integral, U-shaped one piece unit that is removably attached to the upper portion of back support 32. Thus, if the vehicle was involved in a collision, or the like, where energy was absorbed by cover member 72 or end portions 80, the entire unit could be readily replaced. Similarly, replacement of pad 90 in headrest 22 could also be easily accomplished.

In short, integral child seat 16 of the present invention provides a number of advantages that simplify its construction and operation over conventional integral child seats. More specifically, use of pliable member 64 to fasten seat member 20 in its stowage position while also serving as a protective cover for a portion of bench seat 10 is an advantageous feature of the present invention. In addition, selected portions of child seat 16 are provided with a lining of an energy absorbing material. This material absorbs a portion of the total energy dissipated when an occupant strikes and/or loads into child seat 16, thereby reducing the overall amount of energy absorbed.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What it claimed is:

1. In a child seat of the type adapted for integration into a vehicle seat and having a seat member and a headrest that are each supported for movement relative to a back support member, an improvement comprising a head support member disposed within the headrest and a crushable energy absorbing pad supported thereon, said energy absorbing pad adapted to permanently crush for absorbing a portion of the energy dissipated when an occupant of the child seat engages the headrest in response to the vehicle seat being subjected to an acceleration.

2. The child seat of claim 1 wherein said energy absorbing pad is interposed between said head support member and a cushion pad covered by an upholstered surface.

3. The child seat of claim 1 wherein said energy absorbing pad is interposed between said head support member and a cushion pad, said cushion pad being relatively soft such that the head of the occupant engages said relatively soft cushion pad when seated within the child seat, said energy absorbing pad being adapted to crush for absorbing loading exerted thereon when the occupant engages the headrest with a force sufficient to initiate crushing of said energy absorbing pad.

4. A child seat adapted to be integrated into a vehicle seat, said child seat comprising:
   a headrest portion;
   a backrest portion;
   a seat portion; and
   energy absorbing means affixed to said backrest, said energy absorbing means having a lateral cover member that extends across said backrest and an end portion extending forwardly from each end of said cover member, said end portions and said cover member thereby defining a recess for receiving a portion of a seat occupant's torso such that when said occupant's torso engages of said cover member and said end portions said energy absorbing means is permanently crushed to absorb energy dissipated by the engagement therebetween.

5. The child seat of claim 4 wherein said end portions integrally extend from said cover member such that said energy absorbing means is a unitary U-shaped member.

6. The child seat of claim 4 wherein said end portions extend forward from said cover member such that lateral movement of said child occupant is limited by said end portions.

7. The child seat of claim 4 wherein said headrest is pivotally coupled to an upper portion of said backrest by a pair of hinges, said hinges being disposed within said end portions of said cover member.

8. The child seat of claim 4 wherein at least a portion of said headrest is disposed within said recess when in a lowered stowage position.

9. A child seat integrated into a vehicle seat and adapted to be moved from a stowed position to a deployed position by lowering a seat member and elevating a headrest, thereby exposing a backrest and safety belt restrain system, said child seat having latching means for retaining said seat member in said stowed position, said latching means comprising a pliable member extending from said seat member and retaining means affixed to a free end of said pliable member for operatively engaging a portion of said backrest when said seat member is in said stowed position such that said seat member is maintained in a held relationship with respect to said backrest when said seat member is in said stowed position.

10. The child seat of claim 9 wherein said pliable member provides a protective cover for said vehicle seat when said seat member is in a lowered operative position.

11. The child seat of claim 9 wherein said retaining means comprises a plurality of fasteners provided on the distal free end of said pliable member which are engagable with a corresponding plurality of fasteners retainers located on an upper portion of said backrest, whereby when said seat member is in said stowed position said pliable member extends upwardly from said seat member along said backrest and is removably affixed to said upper end of said backrest.

12. The child seat of claim 11 wherein said upper end of said backrest pivotally supports a headrest such that when said headrest is pivoted into a lowered stowed position, said headrest operatively engages at least a portion of said pliable member, thereby retaining said pliable member between said headrest and said backrest.

13. The child seat of claim 12 wherein said fastener retainers vertically extend from a portion of said backrest such that when said seat member is in said stowed position and said fastener retainers are engaged by said fasteners, tension upon said pliable member creates a shear load between said fasteners and said fastener retainers.

14. In a child seat integrated into a backrest of a vehicle seat and adapted to be moved from a stowed position concealed within the backrest to a deployed position by elevating a headrest and lowering a seat member for exposing a child seat backrest and a safety belt restraint system, the improvement comprising:
   first energy absorbing means disposed within the headrest for absorbing energy dissipated when a child seat occupant's head operatively engages said first energy absorbing means;
   second energy absorbing means affixed to an upper portion of the child seat backrest, said second energy absorbing means having a laterally extending cover member and a pair of end portions extending from opposite ends of said laterally extending cover member, said second energy absorbing means provided for absorbing energy dissipated when the seat occupant's torso operatively engages said second energy absorbing means; and
   a pliable member extending from a portion of the seat member, said pliable member having retaining means affixed thereto for operatively engaging a portion of the child seat backrest when the seat member is in the stowed position such that the seat member is maintained in a fixed position with respect to the backrest when said retaining means are engaged.

15. The child seat of claim 14 wherein said laterally extending cover member and said end portions define a recess within the child seat for receiving the occupant's upper torso and for receiving the headrest when the headrest is lowered into a stowed position.

16. The child seat of claim 14 wherein said pliable member is interposed between the headrest and the child seat backrest when the child seat is in the stowed position.

17. The child seat of claim 14 wherein said retaining means are a plurality of fasteners affixed to a distal free end of said pliable member, said fasteners being engageable with fastener retainers that extend from said second energy absorbing means.

* * * * *

UNITED STATES PATENT AND TRADEMARK OFFICE
CERTIFICATE OF CORRECTION

PATENT NO. : 5,385,384
DATED : January 31, 1995
INVENTOR(S) : Karl E. Gierman et al.

It is certified that error appears in the above-indentified patent and that said Letters Patent is hereby corrected as shown below:

ON THE TITLE PAGE, insert --Assignee: Douglas & Lomason Company, Farmington Hills, Mich.--

On the Title Page, insert Attorney, Agent, or Firm --Harness, Dickey & Pierce--.
Column 7, line 56, claim 4, after "engages", insert --one--.

Signed and Sealed this

Thirteenth Day of June, 1995

Attest:

BRUCE LEHMAN

*Attesting Officer*   *Commissioner of Patents and Trademarks*